(12) United States Patent
James et al.

(10) Patent No.: US 11,333,039 B2
(45) Date of Patent: May 17, 2022

(54) MODULAR BEARING COMPARTMENT

(71) Applicant: United Technologies Corporation, Farmington, CT (US)

(72) Inventors: Denman H. James, West Hartford, CT (US); Nigel D. Sawyers-Abbott, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 126 days.

(21) Appl. No.: 16/818,593

(22) Filed: Mar. 13, 2020

(65) Prior Publication Data
US 2021/0285337 A1 Sep. 16, 2021

(51) Int. Cl.
*F01D 25/16* (2006.01)
*F01D 25/18* (2006.01)
*F16C 19/38* (2006.01)

(52) U.S. Cl.
CPC .............. *F01D 25/16* (2013.01); *F01D 25/18* (2013.01); *F16C 19/383* (2013.01); *F05D 2230/60* (2013.01); *F05D 2240/54* (2013.01); *F16C 2360/23* (2013.01)

(58) Field of Classification Search
CPC .................................. F01D 25/16; F01D 25/18
See application file for complete search history.

(56) References Cited

U.S. PATENT DOCUMENTS

| 5,977,677 | A | 11/1999 | Henry |
| 6,286,303 | B1 | 9/2001 | Pfligler |
| 6,942,451 | B1 | 9/2005 | Alexander |
| 8,727,699 | B2 | 5/2014 | Vetters |
| 9,435,347 | B2 | 9/2016 | Danguy |
| 2005/0132693 | A1 | 6/2005 | Macfarlane |
| 2019/0360352 | A1 | 11/2019 | Carpenter |

FOREIGN PATENT DOCUMENTS

EP 0030230 B1 * 7/1985 ............. F01D 25/16
WO 8002585 W 11/1980

OTHER PUBLICATIONS

EP search report for EP21162350.9 dated Aug. 3, 2021.

* cited by examiner

*Primary Examiner* — Michael L Sehn
(74) *Attorney, Agent, or Firm* — Getz Balich LLC

(57) ABSTRACT

A gas turbine engine includes a turbine and a compressor in rotational communication with the turbine via a shaft. The shaft is rotatable about a longitudinal centerline and includes a first axial end and a second axial end opposite the first axial end. The gas turbine engine further includes a first bearing compartment including a first compartment casing detachably mounted axially outside the compressor and the turbine. The first bearing compartment is in contact with the first axial end of the shaft and includes a first bearing which rotatably supports the shaft. The first bearing compartment is self-contained such that an internal lubrication system of the first bearing compartment is fluidly isolated from a remainder of the gas turbine engine outside the first bearing compartment.

12 Claims, 6 Drawing Sheets

MODULAR BEARING COMPARTMENT

BACKGROUND

1. Technical Field

This disclosure relates generally to bearing compartments for gas turbine engines, and more particularly to modular bearing compartments.

2. Background Information

Gas turbine engines may generally include a compressor/pump and a turbine connected to one another by a rotatable shaft so that rotation of the turbine drives the compressor. The rotatable shaft may be rotationally supported by one or more bearings housed in one or more bearing compartments within the gas turbine engine. Conventional bearing compartments are integral with the engine structure and cannot generally be removed from the gas turbine engine without substantial disassembly of components or sections of the gas turbine engine, such as the turbine and compressor sections. Further, conventional bearing compartments may require lubrication and buffering system connections which can complicate installation and removal of the bearing compartments while also increasing the size and weight of the gas turbine engine. Accordingly, what is needed are methods and systems addressing one or more of the above-noted concerns.

SUMMARY

It should be understood that any or all of the features or embodiments described herein can be used or combined in any combination with each and every other feature or embodiment described herein unless expressly noted otherwise.

According to an embodiment of the present disclosure, a gas turbine engine includes a turbine and a compressor in rotational communication with the turbine via a shaft. The shaft is rotatable about a longitudinal centerline and includes a first axial end and a second axial end opposite the first axial end. The gas turbine engine further includes a first bearing compartment including a first compartment casing detachably mounted axially outside the compressor and the turbine. The first bearing compartment is in contact with the first axial end of the shaft and includes a first bearing which rotatably supports the shaft. The first bearing compartment is self-contained such that an internal lubrication system of the first bearing compartment is fluidally isolated from a remainder of the gas turbine engine outside the first bearing compartment.

In the alternative or additionally thereto, in the foregoing embodiment, the first compartment casing includes a flange for mounting the first bearing compartment to an axially exterior portion of the turbine or the compressor.

In the alternative or additionally thereto, in the foregoing embodiment, the first compartment casing includes a shaft aperture, configured for passage of the shaft therethrough, and a shaft seal mounted to the first compartment casing about the shaft aperture and configured to be in sealing communication with the shaft.

In the alternative or additionally thereto, in the foregoing embodiment, the first bearing compartment further includes a stub shaft extending through the shaft aperture. The stub shaft includes a first end disposed inside the first compartment casing and a second end in communication with the first axial end of the shaft. The stub shaft is rotationally fixed relative to the shaft.

In the alternative or additionally thereto, in the foregoing embodiment, the first axial end of the shaft includes a recess which retains the second end of the stub shaft.

In the alternative or additionally thereto, in the foregoing embodiment, the second end of the stub shaft includes a tapered surface.

In the alternative or additionally thereto, in the foregoing embodiment, one or both of the stub shaft and the shaft include a splined portion.

In the alternative or additionally thereto, in the foregoing embodiment, the first bearing compartment further includes a compartment insulation applied to at least a portion of one or both of an interior surface and an exterior surface of the first compartment casing.

In the alternative or additionally thereto, in the foregoing embodiment, the first axial end of the shaft is disposed inside the first bearing compartment.

In the alternative or additionally thereto, in the foregoing embodiment, the first bearing is a magnetic bearing.

In the alternative or additionally thereto, in the foregoing embodiment, the first bearing is a grease-packed bearing.

In the alternative or additionally thereto, in the foregoing embodiment, the gas turbine engine further includes a second bearing compartment including a second compartment casing detachably mounted axially outside the compressor and the turbine. The second bearing compartment is in contact with the second axial end of the shaft and includes a second bearing which rotatably supports the shaft.

According to another embodiment of the present disclosure, a method for installing a bearing compartment in a gas turbine engine includes providing a gas turbine engine including a turbine and a compressor in rotational communication with the turbine via a shaft. The shaft is rotatable about a longitudinal centerline and includes a first axial end and a second axial end opposite the first axial end. The method further includes installing a bearing compartment in the gas turbine engine by detachably mounting a compartment casing of the bearing compartment axially outside the compressor and the turbine such that the bearing compartment is in contact with the first axial end of the shaft and a first bearing of the bearing compartment rotatably supports the shaft.

In the alternative or additionally thereto, in the foregoing embodiment, the bearing compartment is a second bearing compartment. The method further includes removing a first bearing compartment prior to the step of installing the second bearing compartment on the gas turbine engine.

In the alternative or additionally thereto, in the foregoing embodiment, the second bearing compartment has a second operational capacity which is different than a first corresponding operational capacity of the first bearing compartment.

In the alternative or additionally thereto, in the foregoing embodiment, the compartment casing includes a shaft aperture. The bearing compartment further includes a stub shaft extending through the shaft aperture. The stub shaft includes a first end disposed inside the first compartment casing and a second end in communication with the first axial end of the shaft. The stub shaft is rotationally fixed relative to the shaft.

In the alternative or additionally thereto, in the foregoing embodiment, the first axial end of the shaft is disposed inside the bearing compartment.

According to another embodiment of the present disclosure, a bearing compartment system for a gas turbine engine includes a shaft which is rotatably about a longitudinal centerline and includes a first axial end and a second axial end opposite the first axial end. The bearing compartment system further includes a bearing compartment including a compartment casing. The bearing compartment is in contact with the first axial end of the shaft and includes a first bearing which rotatably supports the shaft. The bearing compartment is self-contained such that an internal lubrication system of the bearing compartment is configured to be fluidally isolated from a remainder of the gas turbine engine outside the bearing compartment.

In the alternative or additionally thereto, in the foregoing embodiment, the compartment casing includes a shaft aperture. The bearing compartment further includes a stub shaft extending through the shaft aperture. The stub shaft includes a first end disposed inside the first compartment casing and a second end in communication with the first axial end of the shaft. The stub shaft is rotationally fixed relative to the shaft.

In the alternative or additionally thereto, in the foregoing embodiment, the first axial end of the shaft is disposed inside the bearing compartment.

The present disclosure, and all its aspects, embodiments and advantages associated therewith will become more readily apparent in view of the detailed description provided below, including the accompanying drawings.

DETAILED DESCRIPTION

Figure 1:
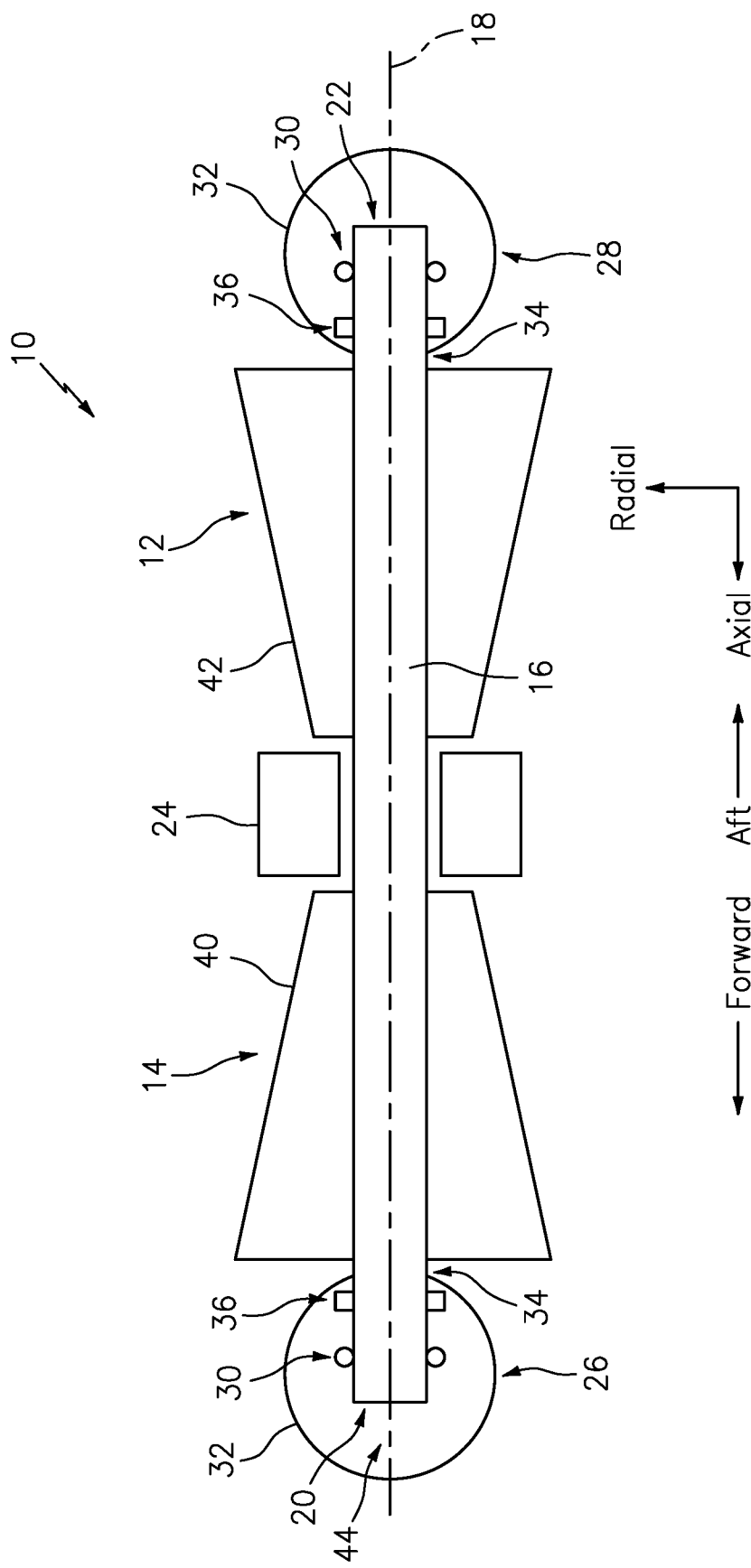
FIG. 1 illustrates a side, schematic view of a gas turbine engine, in accordance with one or more embodiments of the present disclosure.

It is noted that various connections are set forth between elements in the following description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Figure 3:
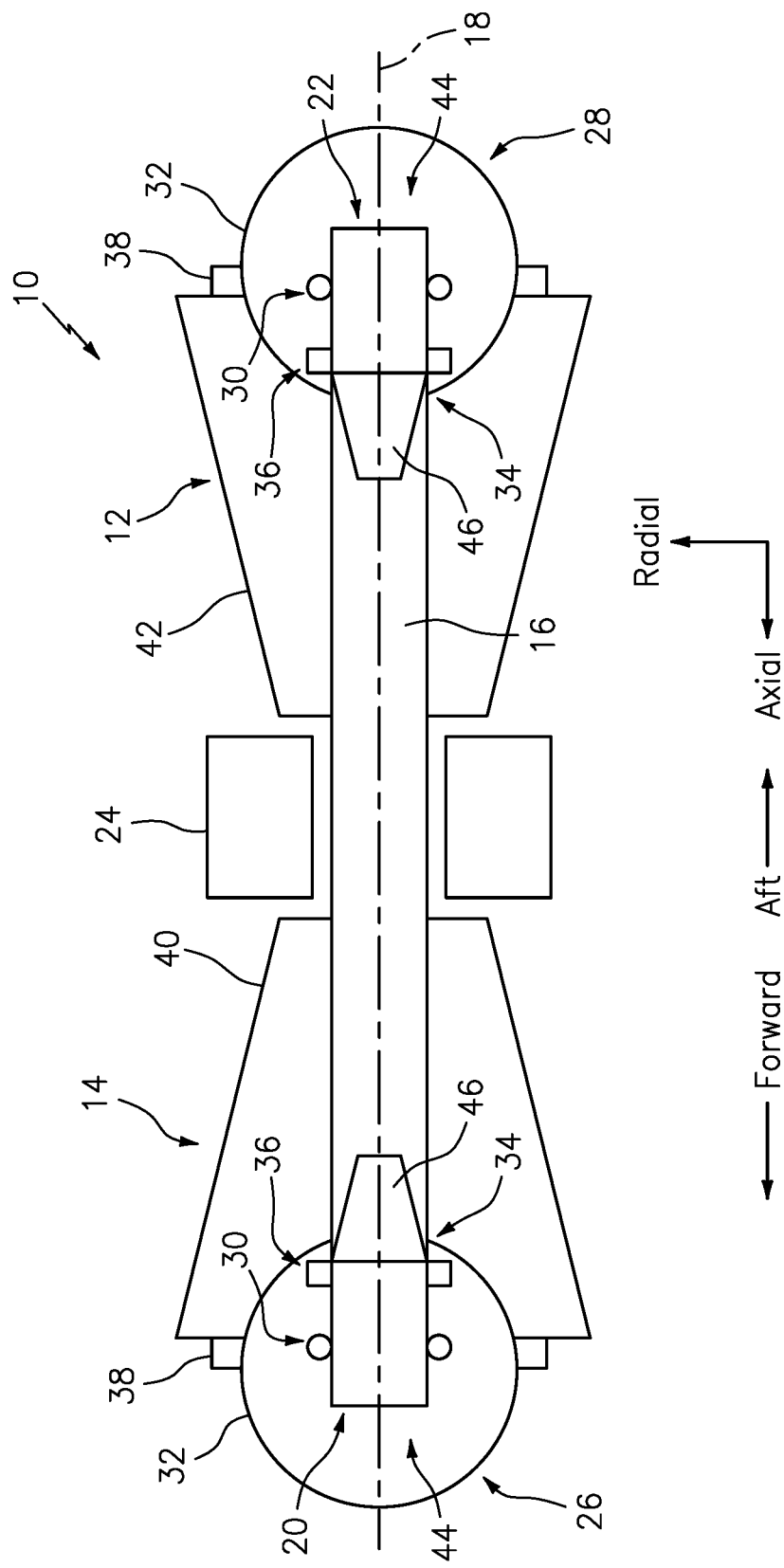
FIG. 3 illustrates a side, schematic view of a gas turbine engine, in accordance with one or more embodiments of the present disclosure.

Referring to FIGS. 1 and 3, a gas turbine engine 10 in accordance with one or more embodiments of the present disclosure is schematically illustrated. Although embodiments of the present disclosure are described herein with respect to the gas turbine engine 10, it should be understood that the present disclosure is also applicable to other types of rotating machines. The gas turbine engine 10 generally includes a turbine 12 and a compressor 14 in rotational communication with the turbine 12 via a shaft 16 configured to rotate about a longitudinal centerline 18 of the gas turbine engine 10. The shaft 10 includes a forward axial end 20 and an aft axial end 22. The compressor 14 drives air along a core flow path for compression and communication into a combustor 24. The airflow along the core flow path is mixed and burned with fuel in the combustor 24 and then expanded over the turbine 12. The turbine 12 rotationally drives the shaft 16 in response to the expansion. Aspects of the present disclosure may be applicable, for example, to attritable gas turbine engines and auxiliary power units (APUs) for drones, missiles, or other aircraft. Further, aspects of the present disclosure may be applicable to other gas turbine engine configurations such as, for example, two-spool gas turbine engines.

The gas turbine engine 10 includes one or more bearing compartments, for example, a forward bearing compartment 26 and an aft bearing compartment 28, each including one or more bearings 30 configured to rotatably support the shaft 16. Each of the forward bearing compartment 26 and the aft bearing compartment 28 may include a compartment casing 32 generally defining an exterior housing of the bearing compartment 26, 28. The compartment casing 32 includes a shaft aperture 34 configured for passage of the shaft 16 therethrough. In various embodiments, the bearing compartments 26, 28 may include a shaft seal 36 mounted to the compartment casing 32 about the shaft aperture 34 and configured to be in sealing communication with the shaft 16. In various other embodiments, the shaft seal 36 may be mounted to the shaft 16 and configured to be in sealing communication with the compartment casing 32. The forward bearing compartment 26 may be in contact with the forward axial end 20 of the shaft 16 such that the forward bearing compartment 26 is in mechanical communication with the forward axial end 20 of the shaft 16 or the forward axial end 20 of the shaft 16 is disposed within the forward bearing compartment 26. Similarly, the aft bearing compartment 28 may be in contact with the aft axial end 22 of the shaft 16 such that the aft bearing compartment 28 is in mechanical communication with the aft axial end 22 of the shaft 16 or the aft axial end 22 of the shaft 16 is disposed within the aft bearing compartment 28.

The compartment casings 32 of the respective bearing compartments 22, 24 may be mounted axially outside the compressor 14 and the turbine 12. For example, the compartment casing 32 of the forward bearing compartment 26 may be mounted axially forward of the compressor 14 while the compartment casing 32 of the aft bearing compartment 28 may be mounted axially aft of the turbine 12. In various embodiments, the compartment casing 32 may include a flange 38 for mounting the respective bearing compartment 26, 28, for example, with a plurality of fasteners. In various embodiments, the flange 38 may be used to mount the forward bearing compartment 26 to an axially exterior portion of the compressor 14, for example, a compressor casing 40 of the compressor 14. In various embodiments, the flange 38 may be used to mount the aft bearing compartment 28 to an axially exterior portion of the turbine 12, for example a turbine casing 42 of the turbine 12. In various other embodiments, the bearing compartments 26, 28 may be mounted to other static structures of the gas turbine engine 10 separate from the turbine 12 or the compressor 14. In various embodiments, one or both of the bearing compartments 26, 28 may be detachably mounted such that the bearing compartments 26, 28 may be installed or removed without physical entry into the turbine 12 or the compressor 14.

The compartment casing 32 may define a housing for an internal lubrication system 44 disposed within the bearing compartments 26, 28 and configured to provide cooling and lubrication to the bearings 30. The bearing compartments 26, 28 may be self-contained such that the internal lubrication system 44 of the respective bearing compartment 26, 28 is fluidally isolated from a remainder of the gas turbine engine 10 outside the respective bearing compartment 26, 28. For example, the internal lubrication system 44 of the bearing compartments 26, 28 may not be in fluid communication with any support systems such as oil supply, oil scavenge, fluid cooling, hydraulic damping, or any other fluid systems of the gas turbine engine 10. Accordingly, the bearing compartments 26, 28 may be installed or removed without consideration for any fluid system connections.

Figure 2:
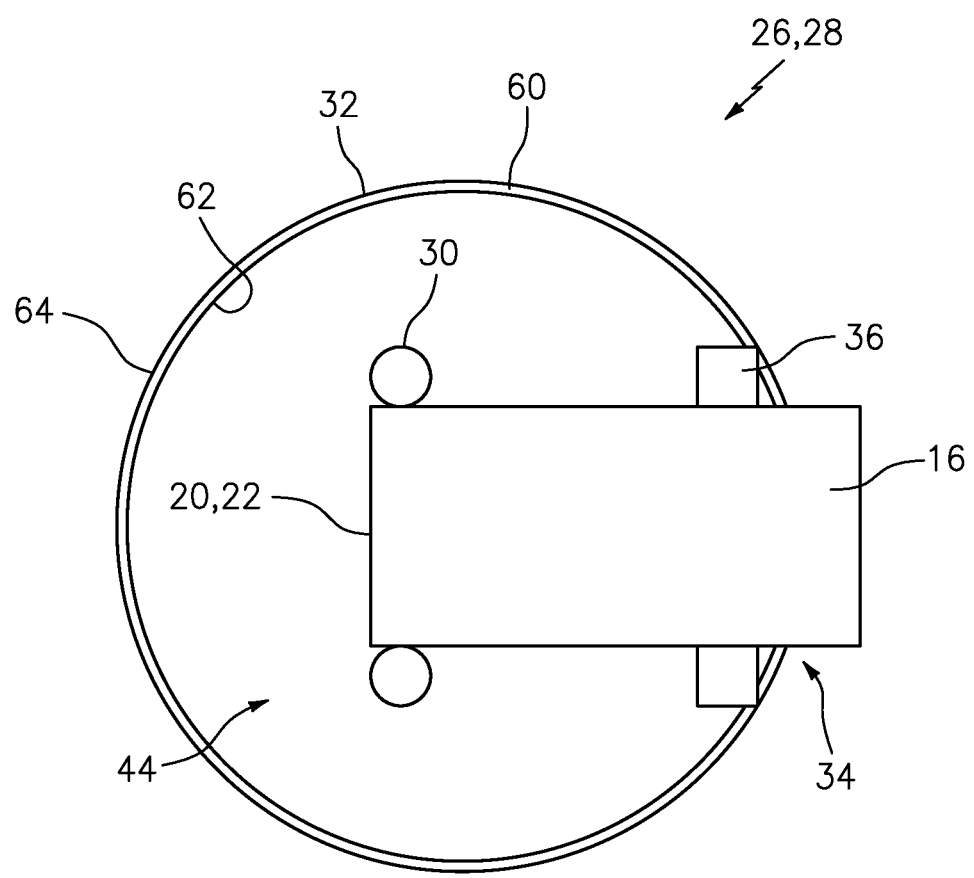
FIG. 2 illustrates a schematic view of an exemplary bearing compartment of the gas turbine engine of FIG. 1, in accordance with one or more embodiments of the present disclosure.

Referring to FIGS. 1 and 2, in various embodiments, portions of the shaft 16 may be disposed within the bearing compartments 26, 28. As illustrated, the forward axial end 20 of the shaft 16 may be disposed inside the forward bearing compartment 26 via the shaft aperture 34. Similarly, the aft axial end 22 of the shaft 16 may be disposed inside the aft bearing compartment 28 via the shaft aperture 34. In various other embodiments, the shaft 16 may pass through the bearing compartments 26, 28 such that, for example, the forward axial end 20 of the shaft 16 may be disposed axially forward of the forward bearing compartment 26 and/or the aft axial end 22 of the shaft 16 may be disposed axially aft of the aft bearing compartment 28.

Figure 4:
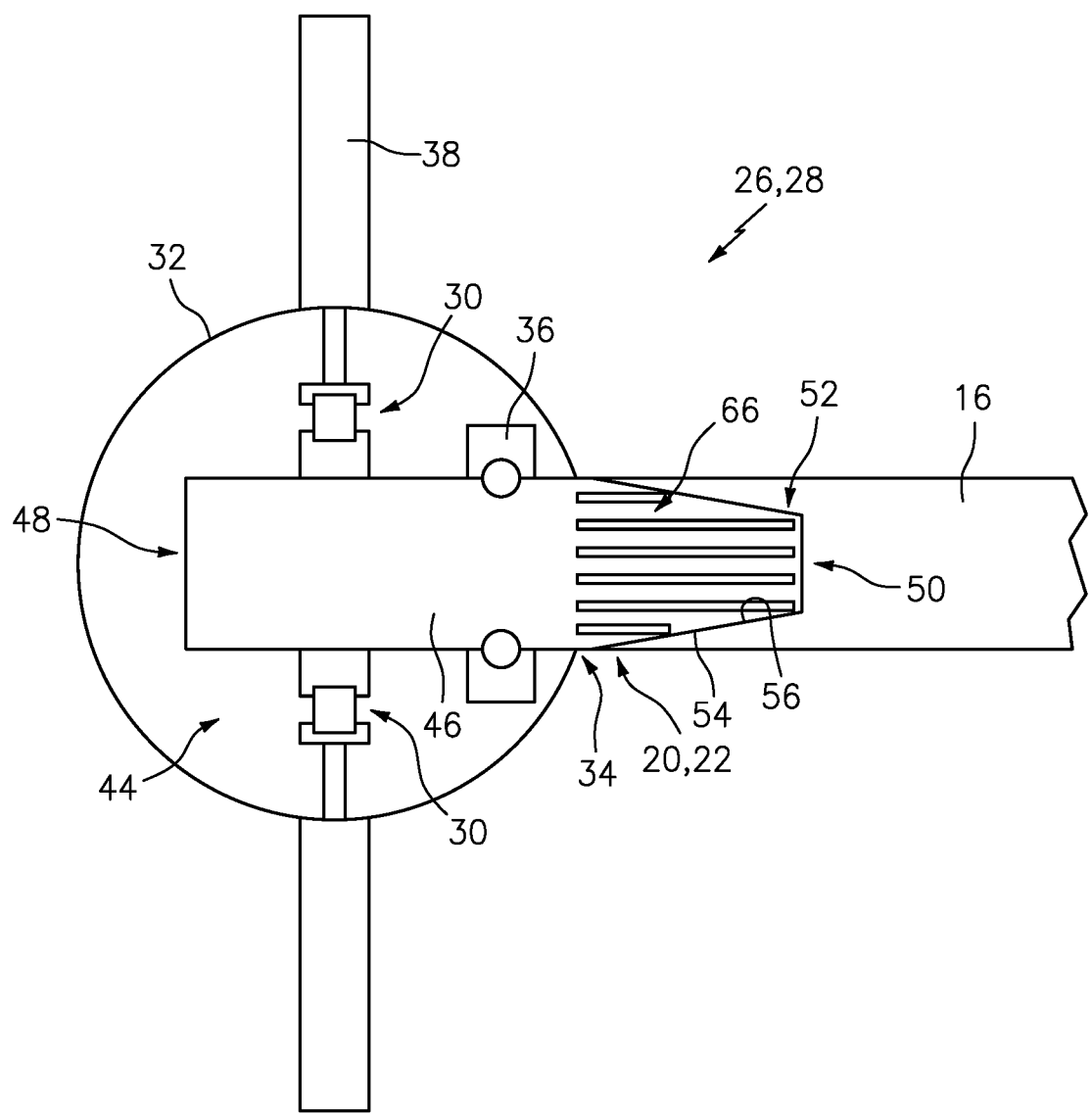
FIG. 4 illustrates a schematic view of an exemplary bearing compartment of the gas turbine engine of FIG. 3, in accordance with one or more embodiments of the present disclosure.
Figure 5:
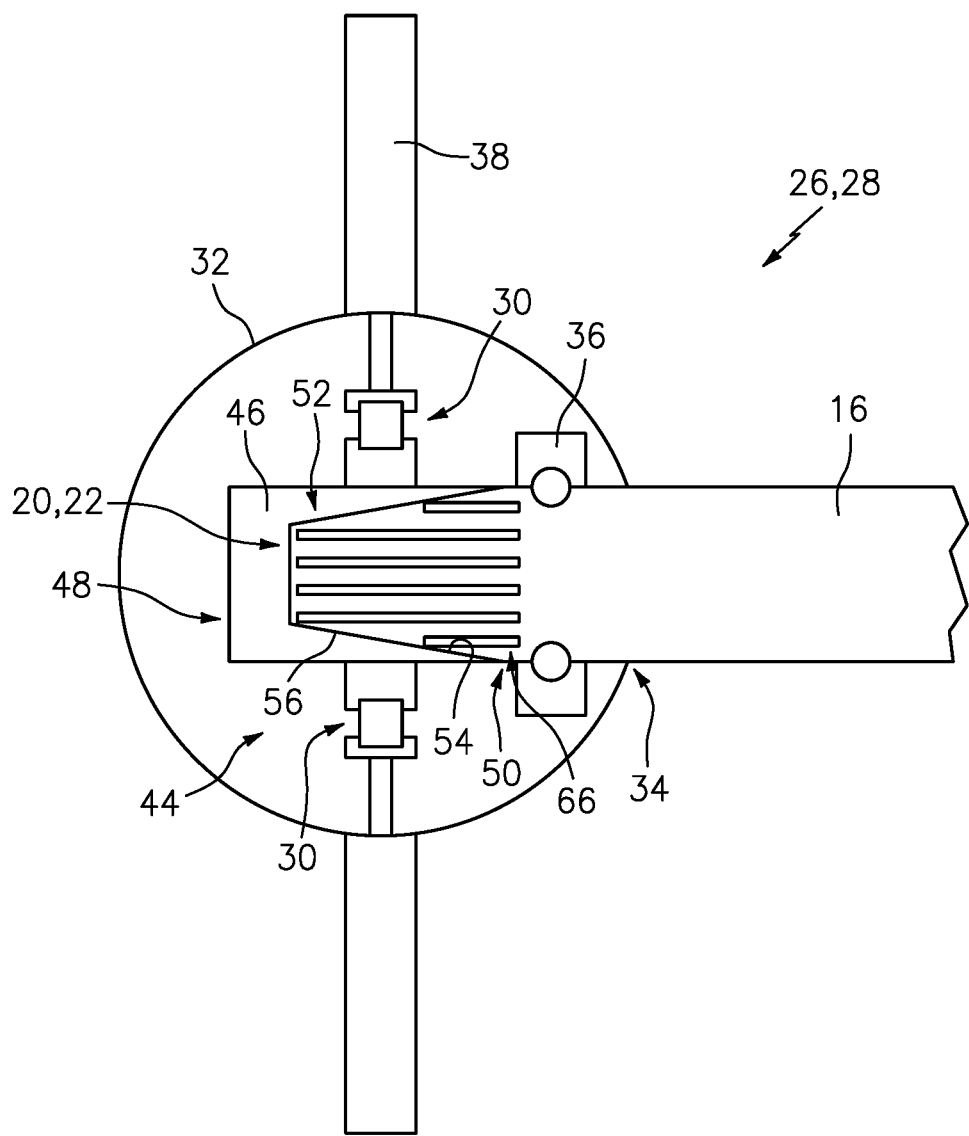
FIG. 5 illustrates a schematic view of an exemplary bearing compartment of the gas turbine engine of FIG. 3, in accordance with one or more embodiments of the present disclosure.

Referring to FIGS. 3-5, in various embodiments, one or both of the bearing compartments 26, 28 may include a stub shaft 46 rotatably supported by the bearings 30 and extending through the shaft aperture 34. The stub shaft 46 may include a first end 48 disposed inside the compartment casing 32 and a second end 50 opposite the first end 48. The second end 50 of the stub shaft 46 may be in communication with the respective axial end 20, 22 of the shaft 16. Accordingly, the stub shaft 46 may be rotationally fixed relative to the shaft 16 such that the shaft 16 is rotatably supported by the bearings 30 via the stub shaft 46.

In various embodiments, one or both of the axial ends 20, 22 of the shaft 16 may include a recess 52 which retains the second end 50 of the stub shaft 46 (see FIG. 4). Alternatively, for example, the second end 50 of the stub shaft 46 may include the recess 52 which retains the respective axial end 20, 22 of the shaft 16 (see FIG. 5). As previously discussed, the stub shaft 46 may be rotationally fixed relative to the shaft 16. Accordingly, the recess 52 may have a shape that substantially corresponds to a counterpart shape of the second end 50 of the stub shaft 46. In various embodiments, the second end 50 of the stub shaft 46 may include a tapered surface 54 configured to mate with a corresponding tapered surface 56 of the shaft 16 within the recess 52. In various embodiments, one or both of the stub shaft 46 and the shaft 16 may further include a splined portion 66 to prevent relative rotation between the shaft 16 and the stub shaft 46. In various embodiments, the splined portion 66 may be disposed on the tapered surface 54, 56.

Figure 6:
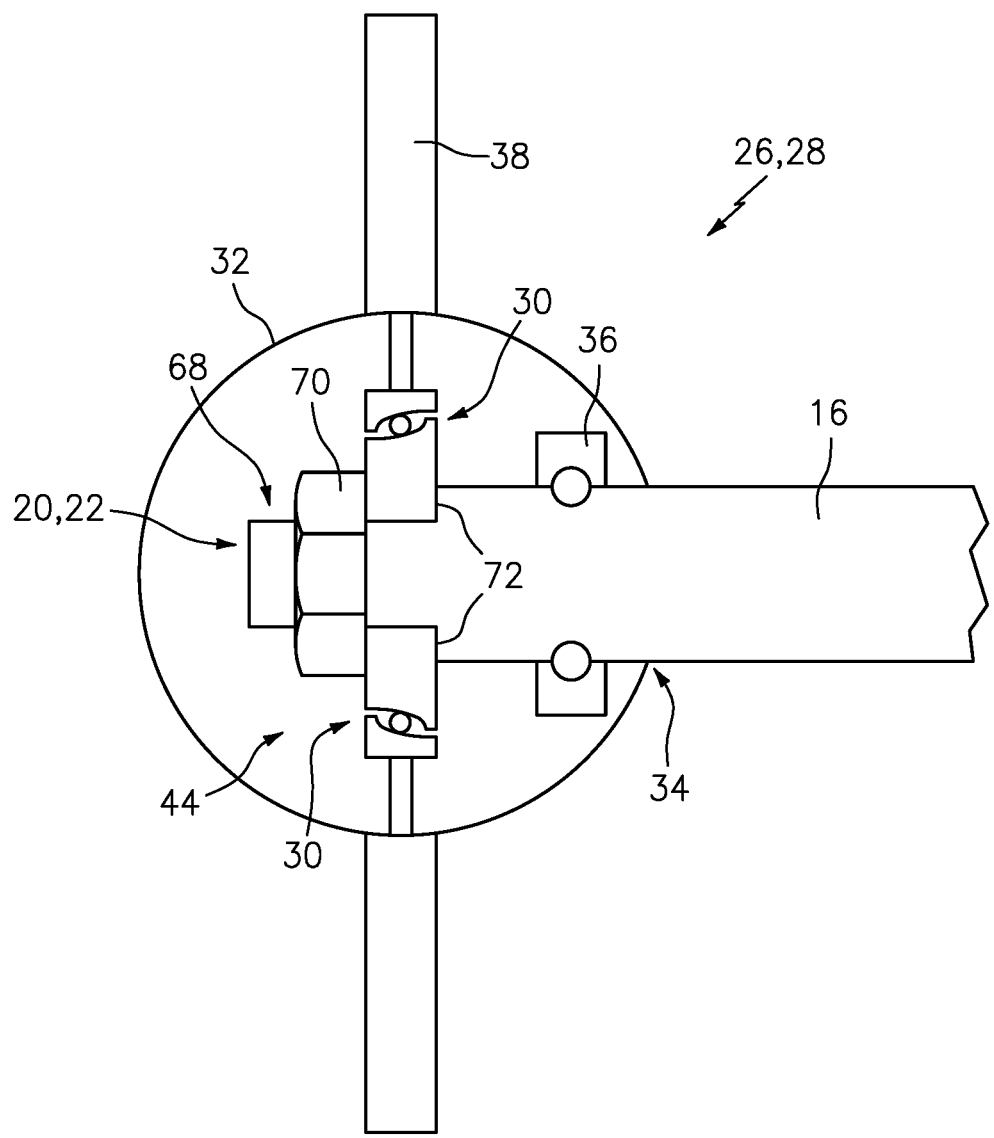
FIG. 6 illustrates a schematic view of an exemplary bearing compartment of the gas turbine engine of FIG. 3, in accordance with one or more embodiments of the present disclosure.

Referring to FIG. 6, in various embodiments, the axial ends 20, 22 of the shaft 16 may include a threaded portion 68 configured to receive a fastener 70. The fastener 70 may retain the shaft 16 in position with respect to the bearing 30. In various embodiments, the fastener 70 may be mounted to or may be integral with an interior race 72 of the bearing 30.

Referring to FIGS. 1-6, in various embodiments, the bearing compartments 26, 28 may include one or more features for circulating lubricant and/or lubricating the bearings 30. For example, in various embodiments, the stub shaft 46 may include an impeller portion disposed within the compartment casing 32. The impeller portion of the stub shaft 46 may function to circulate lubricant within the internal lubrication system 44 and provide lubricant to the bearings 30.

In various embodiments, one or more of the bearing compartments 26, 28 may include a compartment insulation 60 applied to at least a portion of one or both of an interior surface 62 and an exterior surface 64 of the compartment casing 32 (see, e.g., FIG. 2). The compartment insulation 60 may provide thermal isolation to the internal lubrication system 44 from the gas turbine engine 10.

The bearings 30 of the present disclosure may include any bearing configuration suitable for rotatably supporting the shaft 16 or the stub shaft 46. For example, in various embodiments, the bearings 30 may be configured as roller bearings (see, e.g., FIGS. 4 and 5). Alternatively, in various embodiments, the bearings 30 may be configured as ball bearings and/or thrust bearings (see, e.g., FIG. 6).

In various embodiments, to provide lubrication and cooling of the bearing 30, the internal lubrication system 44 may use the compartment casing 32 to provide cooling to the lubricant of the internal lubrication system 44. Specifically, lubricant within the internal lubrication system 44 may be cooled by external airflow passing over the exterior surface 64 of the compartment casing 32. In various other embodiments, alternative methods of cooling and/or lubricating the bearings 30 may be used. For example, in various embodiments, the bearings 30 may be configured as grease-packed bearings. In various embodiments, for example, where the operational time of the gas turbine engine 10 is expected to be sufficiently short, a dry lubricant may be applied to the bearings 30 prior to operation.

The modular nature of the bearing compartments 26, 28, as disclosed herein, may allow for relatively quick installation and removal of bearing compartments 26, 28, in the field, as required for gas turbine engine 10 operations. In various embodiments, the modular bearing compartments 26, 28 may be replaced to utilize a bearing compartment having an appropriate operational capacity for a given mission (e.g., a duration, condition, or engine loading capacity). For example, a bearing compartment 26, 28 with a first operational capacity may be replaced with a bearing compartment 26, 28 having a second corresponding operational capacity which is different than the first operational capacity and more appropriate for a given mission. Further, the bearing compartments 26, 28 may enable the gas turbine engine 10 to be stored independent of conditions which may generally be required for successful storage of conventional gas turbine engine bearings. In other words, preservation of the bearing compartments 26, 28 and associated bearings 30 may not be required during gas turbine engine 10 downtime because new bearing compartments 26, 28 can be quickly installed in the gas turbine engine 10 prior to an intended operation. For example, grease-packed bearings may be refreshed when the grease shelf life expires, without requiring significant overhaul to the gas turbine engine 10.

Additionally, the self-contained configuration of the bearing compartments 26, 28, according to embodiments of the present disclosure, may enable a reduction in a diameter/size of the gas turbine engine 10 core, and an associated reduction in weight, as a result of the elimination of bearing support systems conventionally used for bearing compartments.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

What is claimed is:

1. A gas turbine engine comprising:
    a turbine;
    a compressor in rotational communication with the turbine via a shaft, the shaft rotatable about a longitudinal centerline and comprising a first axial end and a second axial end opposite the first axial end; and
    a first bearing compartment comprising a first compartment casing detachably mounted axially outside the compressor and the turbine, the first bearing compartment in contact with the first axial end of the shaft and comprising a first bearing which rotatably supports the shaft, the first compartment casing defining a shaft aperture;
    wherein the first bearing compartment is self-contained such that an internal lubrication system of the first bearing compartment is fluidity isolated from a remainder of the gas turbine engine outside the first bearing compartment, and
    wherein the first axial end of the shaft comprises a recess and wherein the first bearing compartment further comprises a stub shall extending through the shaft aperture, the stub shaft comprising a first end disposed inside the first compartment casing and a second end configured to be retained within the recess of the first axial end of the shall such that the stub shaft is configured to be rotationally fixed relative to the shaft.

2. The gas turbine engine of claim 1, wherein the first compartment casing comprises a flange for mounting the first bearing compartment to an axially exterior portion of the turbine or the compressor.

3. The gas turbine engine of claim 2, wherein the first bearing compartment comprises a shaft seal mounted to the first compartment casing about the shaft aperture and in sealing communication with the stub shaft.

4. The gas turbine engine of claim 1, wherein the second end of the stub shaft includes a tapered surface.

5. The gas turbine engine of claim 1, wherein one or both of the stub shaft and the shaft further comprise a splined portion.

6. The gas turbine engine of claim 1, wherein the first bearing compartment further comprises a compartment insulation applied to at least a portion of one or both of an interior surface and an exterior surface of the first compartment casing.

7. The gas turbine engine of claim 1, wherein the first bearing is a grease-packed bearing.

8. The gas turbine engine of claim 1, further comprising a second bearing compartment comprising a second compartment casing detachably mounted axially outside the compressor and the turbine, the second bearing compartment in contact with the second axial end of the shaft and comprising a second bearing which rotatably supports the shaft.

9. A method for installing a bearing compartment in a gas turbine engine, the method comprising:
    providing a gas turbine engine comprising a turbine and a compressor in rotational communication with the turbine via a shaft, the shaft rotatable about a longitudinal centerline and comprising a first axial end and a second axial end opposite the first axial end; and
    installing the bearing compartment in the gas turbine engine by detachably mounting a compartment casing of the bearing compartment axially outside the compressor and the turbine such that the bearing compartment is in contact with the first axial end of the shaft and a first bearing of the bearing compartment rotatably supports the shaft,
    wherein the compartment casing defines a shaft aperture, wherein the first axial end of the shaft comprises a recess, and wherein the bearing compartment further comprises a stub shaft extending through the shaft aperture, the stub shaft comprising a first end disposed inside the compartment casing and a second end configured to be retained within the recess of the first axial end of the shaft such that the stub shaft is configured to be rotationally fixed relative to the shaft.

10. The method of claim 9, wherein the bearing compartment is a second bearing compartment, the method further comprising removing a first bearing compartment prior to the step of installing the second bearing compartment on the gas turbine engine.

11. The method of claim 10, wherein the second bearing compartment has a second operational capacity which is different than a first corresponding operational capacity of the first bearing compartment.

12. A bearing compartment system for a gas turbine engine, the bearing compartment system comprising:
    a shaft rotatable about a longitudinal centerline and comprising a first axial end and a second axial end opposite the first axial end; and
    a bearing compartment comprising a compartment casing, the bearing compartment in contact with the first axial end of the shaft and comprising a first bearing which rotatably supports the shaft,
    wherein the bearing compartment is self-contained such that an internal lubrication system of the bearing compartment is configured to be fluidly isolated from a remainder of the gas turbine engine outside the bearing compartment, and wherein the compartment casing defines a shaft aperture, wherein the first axial end of the shaft comprises a recess, and wherein the bearing compartment further comprises a stub shaft extending through the shaft aperture, the stub shaft comprising a first end disposed inside the compartment casing and a second end configured to be retained within the recess of the first axial end of the shaft such that the stub shaft is configured to be rotationally fixed relative to the shaft.

* * * * *